Jan. 30, 1962
D. P. HEARN
3,019,395
ELECTRICAL DEVICE FOR COMPENSATING BIAS
SHIFT OF ELECTRON TUBES
Filed April 24, 1957
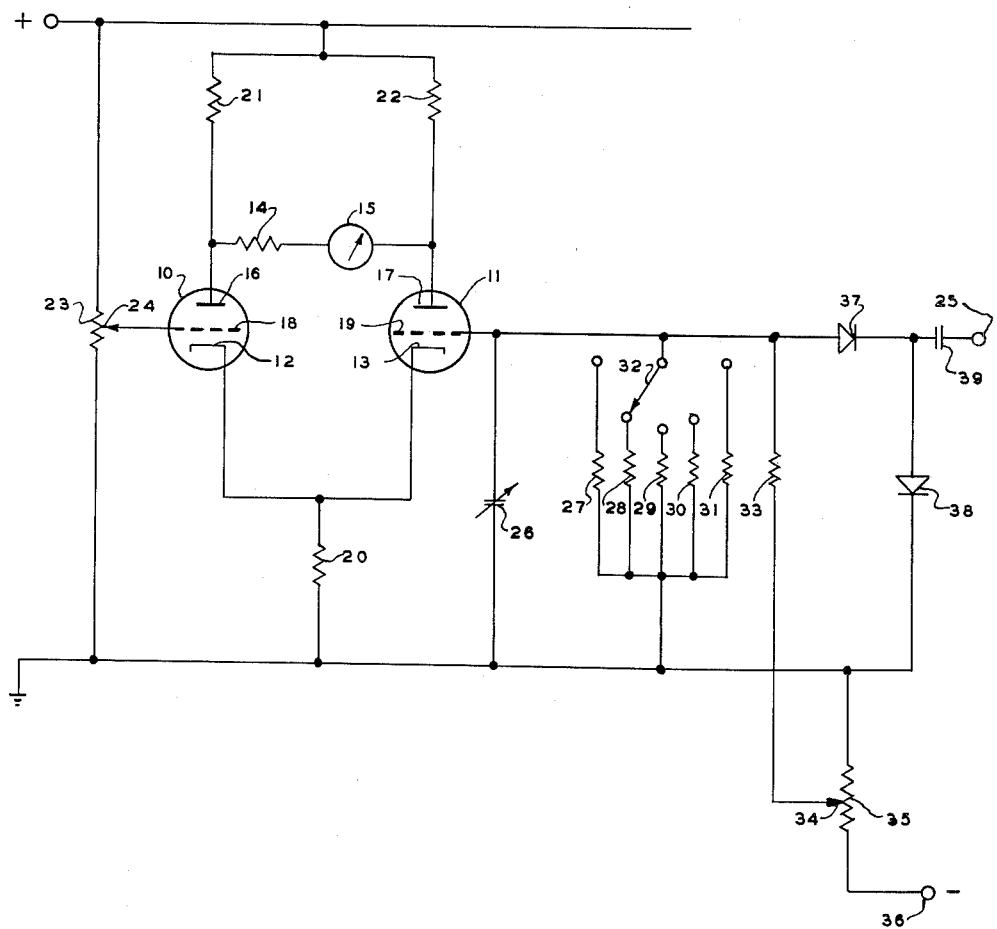
INVENTOR.
*Daniel P. Hearn.*
BY
*Robert K. Schumacher*
ATTORNEY 3,019,395
ELECTRICAL DEVICE FOR COMPENSATING
BIAS SHIFT OF ELECTRON TUBES
Daniel P. Hearn, Tulsa, Okla., assignor to Well Surveys
Incorporated, a corporation of Delaware
Filed Apr. 24, 1957, Ser. No. 654,944
1 Claim. (Cl. 328—258)

This invention relates to an electrical device having at least one grid-controlled electron tube, variable grid resistance means and a bias. Electronic counting-rate meters usually comprise electron tubes having storage means and resistance means in their grid circuit. Pulses to be counted are delivered to the storage means.

It is well known that the plate characteristic of electron tubes is linear only in a limited range. It will be shown by reference to a typical counting rate meter circuit that any bias shift due to grid current flow will result in unbalance in the differential vacuum tube voltmeter and incorrect indication at the meter, or the measuring point. Very often it is necessary to vary the scale of a counting rate meter and this may be done by varying the resistance means in the grid circuit. In order to be able to perform this change, the resistance means are provided as an assembly of resistors adapted to be connected selectively to the grid and the storage means.

It has been observed that a change within that resistance means from one resistor to another one causes a bias shift of the electron tube, and the output of the tube may leave the desired range of the plate characteristic. This is because of grid current flowing through the resistance means and a subsequent change of grid bias caused by the IR drop therein.

It will be understood that a counter or a counting rate meter leaving the chosen range of its characteristic finally becomes unreliable and worthless. According to the present invention it has been discovered that a single current source in the grid circuit across the variable resistance means is able to stabilize the bias by balancing the grid current flowing from the internal grid circuit into the external grid circuit so that no grid current flows through the variable resistance means; then a change in resistance will not change the grid bias and the balance; since a vanishing current through the resistance means is independent of said grid resistance means.

It is an object of the present invention to stabilize the bias of the grid controlled electron tube provided with variable grid resistance means.

It is another object of the invention to improve the operation of electronic counting rate meters adjustable to various scales for counting pulse rate in several ranges.

It is a further object of the invention to provide current balancing means in the grid circuit of electron tubes.

These and other objects of the invention will become apparent in the following description of the accompanying drawing showing an electronic counting rate meter adapted to count the rate of electrical pulses and provided with means for stabilizing grid bias in accordance with the invention.

The numerals 10 and 11 indicate two electron tubes with their respective cathodes 12 and 13 connected directly together. The tubes also are connected with a resistor 14 and a measuring instrument 15 between their anodes 16 and 17, respectively. Each electron tube has a control grid, indicated by numerals 18 and 19, respectively. Both tubes 10 and 11 have a common cathode resistor 20 connected between the cathodes and ground. It will be appreciated that tubes 10 and 11 may be a dual triode, dual pentode or the like. Each anode 16 and 17 is connected separately by resistors 21 and 22, respectively, to the proper positive potential of any suitable D.C. source. A voltage divider 23, having a tap 24, is connected between the positive potential and ground. The tap 24 leads to the grid 18, and its position determines the grid voltages and the plate current of tube 10 responsive thereto. The voltage drop across the resistor 20 biases both tubes 10 and 11.

At the terminal 25 the pulses to be counted are delivered into the counting rate meter shown in the drawing. Diodes 37 and 38 direct the charging current of capacitor 39 through the R-C circuit which consists of the capacitor 26 and one of the resistors, 27, 28, 29, 30 or 31, selectively connected by switch 32 to the capacitor 26. It is further possible to use a continuously variable resistance. The resistor selected by proper connection of switch 32 determines the sensitivity of the rate meter. Capacitor 26 may be varied to establish any desired integration time constant.

The counting rate meter operates as follows. Unidirectional current pulses from the diode counting circuit are delivered to the chosen R-C composition, for example, to the capacitor 26 and resistor 28. The capacitor 26 will be charged from those pulses and discharged through resistor 28. Charging and discharging of capacitor 26 will have a particular equilibrium, depending upon the time constant of this R-C circuit; hence there will be an average voltage across the capacitor dependent upon the rate at which pulses are applied and upon the relative values of resistance and capacitance. If the pulses have a constant height and a constant frequency the voltage across the capacitor 26 depends only on the relative size of resistor 28 determining the rate of discharge. When the switch is changed into another position, for example, to connect resistor 29 to capacitor 26, the rate of the mentioned discharge will change corresponding to the value of resistor 29 and so the average voltage across capacitor 26 will change too. It is the voltage on capacitor 26 that is applied to grid 19 and used to control the plate current of tube 11 through resistor 22. This load voltage is measured by instrument 15. A particular counting rate and particular time constant will produce a particular voltage for measurement by instrument 15. Sensitivity having been selected by selection of a particular grid resistor, the instrument 15 measures counting rate. When a different resistor is selected, the scale of the counting rate meter is changed, and instrument 15 measures a different voltage for the same counting rate. This permits the same instrument 15 to be used over a wide range of counting rates, when the scales of the instrument are precalibrated. However, the change in resistor necessary to effect the change of scale also changes the grid bias, in absence of the instant invention.

It is well known that current flows in the grid circuit to or from the control grid of a tube. Where this current flows through grid resistance between the control grid and cathode of a tube, it biases the tube. This may be in addition to other biasing means and is not harmful when the grid resistance is constant. However, with a change in grid resistance the grid current flows through a different resistance, and the voltage drop resulting produces a different grid bias which may well cause the tube to operate outside the proper region of its plate characteristic.

To overcome this shift of bias, it would be possible to insert a separate offsetting auxiliary bias voltage source with each resistor, each source dependent upon the particular resistor. With the present invention it is possible to use but one auxiliary source independent of the resistance value of the selected resistor. A resistor 33 is connected with one end to grid 19; the other end of resistor 33 leads to the tap 34 of the voltage divider 35 which is connected to a potential negative with respect to ground. The terminal of the negative potential is indicated by numeral 36. Empirically it was determined that by adjusting the tap 34, it was possible to keep the plate current of tube 11 substantially independent of the position of the switch; i.e., if the switch couples to the grid, any one of the resistors 27, 28, 29, 30 and 31, the highest, the lowest or any resistor therebetween, the change of the grid bias occasioned thereby is below any reasonable tolerance. This condition obtains when the current supplied to the selected resistor by this auxiliary current source 33, 35, 36 is substantially equal and opposite to the grid current so that there is no net current through the grid resistance in the absence of pulses applied to terminal 25. Under this condition of no current, there is no biasing caused by the grid resistance, and therefore any change in this resistance cannot change the bias. The circuit according to the invention causes a current balance in the external grid circuit. In order to provide this balance, it is preferred that the effective external series E.M.F. and resistance provided by current source 33, 35, 36 be in substantially the same proportion as the effective E.M.F. and the series resistance in the path from ground to the grid 19 through the tube.

The conditions will be explained by an example which does not restrict the scope of the present invention, but showing to those skilled in the art that the invention herein disclosed teaches a very simple way to overcome the above mentioned difficulties. The tube 11 may be one of those known in the field of electronics as a 6SN7 tube; for example, the resistors 27 through 31 may vary from 100,000 ohms to 20 megohms. Changing from the highest resistor to the lowest one would shift the bias approximately 10% if the circuit indicated by numerals 33 through 36 has been omitted. If the resistor 33 is 1,000 megohms and the voltage source 36 about 50 v., the tap of 34 may be adjusted in a position which reduces the bias shift to less than 5% of its previous shifting value which is a negligible bias shift in the range of ½%.

It will be appreciated that the resistor 33 should be a common ohmic resistor as long as, in the range in the characteristic of the electron tube which is of particular interest, the internal resistance of the grid-cathode-path is linear with respect to the grid voltage. If for any reason the internal resistance is nonlinear, resistor 33 may be composed of a nonlinear resistor such as semi-conductors or diodes. It is well known to those skilled in the art, that by coupling of proper nonlinear and linear resistors, it is possible to obtain any kind of nonlinear characteristic.

Accordingly, it should be clearly understood that those forms of the invention described above and shown in the accompanying drawing are illustrative only and are not intended to limit the scope of the invention.

I claim:

A counting rate meter comprising at least one grid controlled electron tube, said tube having an anode, a cathode and at least one control grid, biasing means connected between said cathode and said grid, at least two resistors, a capacitor connected in parallel with said grid and connected selectively to at least one of said resistors, input means to receive pulses to be counted and deliver them to said capacitor, and a direct current source connected to said selected resistor in such a manner as to reduce substantially to zero the current through said selected resistor, independent of the selection, when no pulses are received by said input means.

References Cited in the file of this patent
UNITED STATES PATENTS

| | | |
|---|---|---|
| 2,478,742 | Buonincontri | Aug. 9, 1949 |
| 2,787,761 | Berlin et al. | Apr. 2, 1957 |